United States Patent [19]
Cohen et al.

[11] 4,022,188
[45] May 10, 1977

[54] HIGH EFFICIENCY SOLAR COLLECTOR

[76] Inventors: Jeffrey M. Cohen; Marion D. Cohen, both of 2201 Pennsylvania Ave., Philadelphia, Pa. 19130

[22] Filed: Apr. 5, 1976

[21] Appl. No.: 674,060

[52] U.S. Cl. .................................. 126/271; 126/270
[51] Int. Cl.² ................................................ F24J 3/02
[58] Field of Search ............ 126/270, 271; 237/1 A

[56] References Cited
UNITED STATES PATENTS

| | | | |
|---|---|---|---|
| 2,316,191 | 4/1943 | Scott | 126/271 |
| 2,907,318 | 10/1959 | Awot | 126/271 |
| 2,969,788 | 1/1961 | Newton | 126/271 |
| 3,179,105 | 4/1965 | Falbel | 126/271 |
| 3,815,574 | 6/1974 | Gaydos, Jr. | 126/271 |
| 3,923,039 | 12/1975 | Falbel | 126/271 |

*Primary Examiner*—Kenneth W. Sprague
*Attorney, Agent, or Firm*—Benasutti Associates, Ltd.

[57] ABSTRACT

A novel type of solar collector apparatus is disclosed which comprises a generally planar, horizontally extending absorber having a radiation-accepting aperture in the lower surface thereof, and a duct extending therethrough for receiving a heat transfer fluid. A non-steered reflector is disposed directly beneath the absorber, the reflector exhibiting a cross-sectional configuration of a parabolic cylindrical nature.

9 Claims, 4 Drawing Figures

HIGH EFFICIENCY SOLAR COLLECTOR

BACKGROUND OF THE INVENTION

The present apparatus relates to energy collecting means, and more particularly to an improved solar energy collector which concentrates, absorbs and transfers heat to a fluid.

The practical, efficient utilization of solar energy has for generations been the object of much effort and study. In recent times, as the hazards of air pollution due to the use of fossil fuels have become apparent, along with the potential hazards of nuclear energy sources, considerable attention has been focused upon devising economical and practical means for collecting energy of solar rays. Even more lately shortages of petroleum products along with the rapidly rising cost thereof has lent new urgency to the search for practical means for making use of solar energy.

To date, although much effort has been expended in the development of prototype and experimental solar energy collecting and storage apparatus, none have attained any degree of practical, economic success. The expense and/or inefficiency of construction of the apparatus so far devised has inhibited the development of practical solar energy collection means. Ordinarily, solar collectors comprise a metallic plate or the like enclosed by a glass cover so that the sun's rays might pass through the glass and heat the metal therebeneath. Energy from the heated metal is then collected by a heat transfer fluid, such as air or water which is passed beneath or over the metal whereby it is heated. The heated fluid is then stored until needed, then pumped through other heat transfer devices, e.g., radiators, which extract heat energy from the fluid.

The principal difficulty with prior art solar energy collection apparatus has been that conductive losses through the glass plates, and convective losses between glass plates, have limited the maximum temperature of the heated metal plate to relatively low values. Typically, such values have been below 150° F. Accordingly, the stored heat transfer fluid can be maintained at no more than 150° F., or thereabouts and usually much less.

A still further difficulty has been that the sun's orientation with respect to the flat plate collectors is at an optimum for only one or two hours in a 10-hour day if the collector temperature is 150° F. and the stored heat transfer fluid temperature is approximately 140° F. Accordingly, for a 10 hour period of sunlight, 80 percent of the available solar energy may not be used.

In order to overcome this problem, inventors have devised various types of reflectors for use in conjunction with heat absorbers. Typically, the reflectors are pivoted or swiveled so as to maintain the sun's rays focused upon the absorptive apparatus. Said reflectors are commonly surfaces of rotation such as sections of spheres or paraboloids. However, the cost and complexity of these movable apparatus, hereinafter termed steerable reflectors, is often prohibitive. Further, like any complex movable object, they are susceptible to wear and breakage so that they decrease the overall reliability of the heating system. Further, additional energy is required to drive these steerable reflectors. Accordingly, it will be appreciated that it would be highly desirable to provide an improved absorptive apparatus which absorbs solar energy with relatively little loss and does not require diurnal tracking of the sun. This is not possible with conventional focusing techniques. The efficiency of the present invention in absorbing diffuse light is much greater than that of focusing collectors.

It is accordingly an object of the present invention to provide an improved absorptive means for use with solar energy collection systems.

Another object of the invention is to provide a solar energy collecting apparatus which is stationary and does not have to be steered.

Yet another object of the invention is to provide a solar energy collecting reflector in combination with an absorptive apparatus which makes full use of the sun's rays over an extended period of time.

SUMMARY OF THE INVENTION

Briefly stated, in accordance with one aspect of the invention the foregoing objects are achieved by providing a generally planar, horizontally disposed absorption means having an insulated outer shell which defines a large aperture in the lower surface thereof. The aperture is closed by a pair of parallel glass plates, and duct means are disposed above the plates, within the insulated shell for receiving a heat transfer fluid. An elongate reflector having a parabolic cylindrical cross-section is disposed beneath the absorption means for directing the sun's rays upwardly through the glass upon the duct.

BRIEF DESCRIPTION OF THE DRAWINGS

While the specification concludes with claims particularly pointing out and distinctly claiming the subject matter which is regarded as the invention, it is believed that the invention will be better understood from the foregoing description of a preferred embodiment taken in conjunction with the accompanying drawings in which:

DESCRIPTION OF A PREFERRED EMBODIMENT

Figure 1:
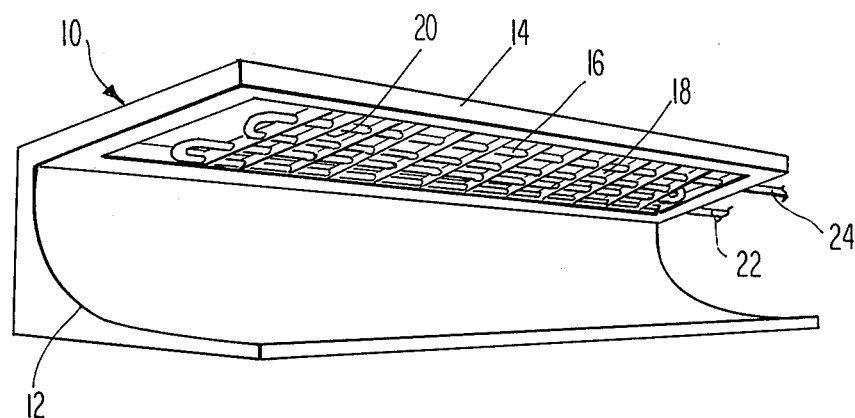
FIG. 1 is an oblique view of apparatus constructed according to the teachings of the present invention.

Referring now to FIG. 1, a solar energy collecting means is shown which comprises an absorption means 10 in combination with a reflecting element 12. The absorption means comprises an extended, horizontal element exhibiting a generally planar structure. The upper and outer surface of the absorption means, not visible in FIG. 1, may be flat and imperforate having no solar energy collection functions. Wood, sheet metal or any other substantially rigid material may be selected for use. Within the outer and upper surface or shell of the absorption means, generally denoted at 14, is a layer which may be formed from any appropriate insulating material. The insulating material terminates about the lower edges of the absorption means to define an enlarged aperture 16 which extends across substantially all of the lower surface of the absorption means. The aperture is closed by a pair of parallel glass sheets, through which can be seen a convoluted length of tubing 18 within which a suitable heat transfer fluid is pumped. A series of vertically disposed, parallel black metal plates 20 are attached to the tube 18 and extend across the surfaces of tube 18 to effectively enlarge the light-receiving surfaces of the duct. A horizontal black metal plate 39 is also attached to and resides just above the tube 18 to enlarge the light-receiving surface of the tube.

Reflecting element 12 is horizontally elongate, as is the absorption means. The transverse cross-section of the reflecting means exhibits a generally parabolic configuration, and the reflecting means may be considered to be generated by the translation of a parabolic arc along a horizontal line parallel to the long axis of the absorption means to form a section of a parabolic cylinder.

It should be understood that while the term "parabolic" is used, functionally similar curvatures may be selected for any given use; or, alternatively, a generally similar configuration may be formed by a plurality of aligned, flat surfaces, each inclined slightly with respect to the next so as to form the desired reflecting surfaces. The reflecting element may be constructed of any suitable material, the surface thereof being highly reflective. Such a surface may be formed from aluminum, alzak, metalized plastic or any one of a number of appropriate materials.

An inlet duct 22 and outlet duct 24 allow heat transfer fluid to be pumped through duct 18, and to an appropriate reservoir or heat sink. In a preferred embodiment these ducts (tubes) should exit through the rear of the absorption means so as not to block any incident solar rays.

Figure 2:
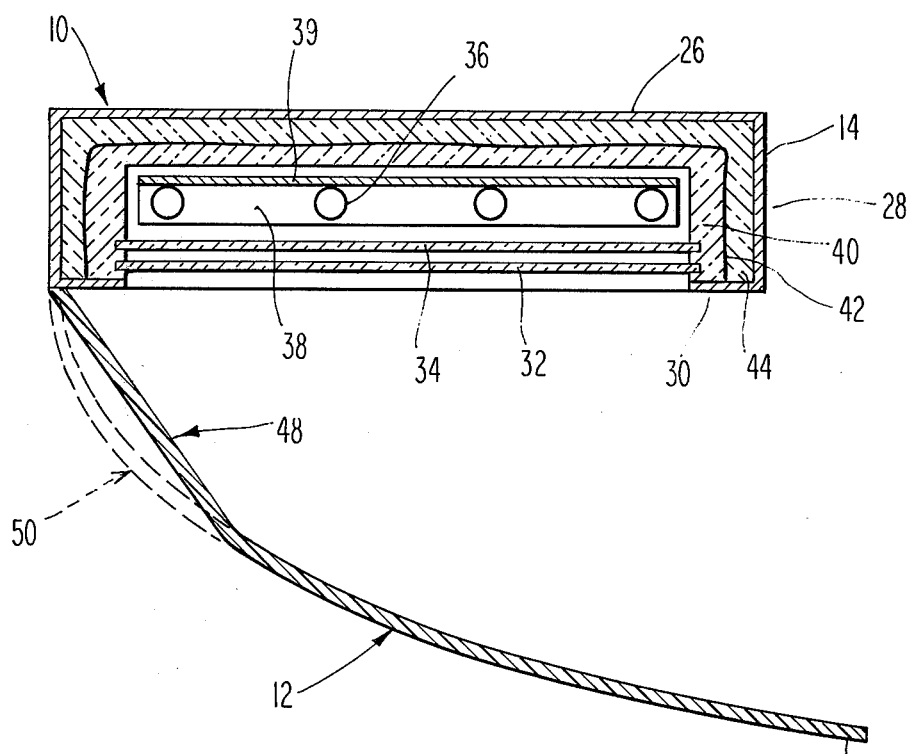
FIG. 2 is a transverse cross-section of an apparatus of the type shown in FIG. 1.

Referring now to FIG. 2, there is shown a transverse cross-sectional view of the apparatus of FIG. 1, illustrating the details of the construction thereof. The absorption means generally indicated at 10 advantageously comprises a shell 14 of a thin, rigid material such as metal or the like. The shell forms an extended upper surface and side surfaces of relatively small depth, so that the overall form of the absorption means is an extended planar element. The shell includes lower portions 30 which define an aperture in the lower surface of the absorption means. The aperture is closed by a pair of glass plates 32, 34 which are disposed horizontally one above the other, and parallel to one another so as to define a narrow air space therebetween. While in a preferred embodiment the two glass sheets are shown, it will readily be seen that more may be used. The space between the glass sheets defines a pocket of stagnant air which effectively decreases heat losses due to conduction. Convective loss in the air is minimal because the hotter glass plate 34 is disposed above the colder glass plate 32.

Most glass is suitable for use in closing the aperture, as it transmits the greater part of solar radiation, but is opaque to infrared radiation. Ordinary crown glass, for example, may be used as well as borosilicate crown glass and flint glass. Borosilicate crown glass has the advantage of exhibiting a relatively large coefficient of transparency for visible and near ultraviolet radiation. Further, to reduce the reflection of impingent radiation, the outermost or lower glass plate may be coated with a material such as magnesium fluoride to reduce the reflectivity of the surface. Each glass plate 32 and 34 acts as a filter which transmits the desired solar radiation entering the absorber and traps the infrared radiation generated within the absorption means. Appropriate insulation is provided about the periphery of the glass plates to avoid unwanted heat transfer to the shell which supports them.

Insulating means are provided within the shell, lining the upper and side surfaces thereof to define a cavity within the shell, above the glass plates. Extending within the cavity are a plurality of ducts 36 which may, for example, comprise convolutions of an elongate length of tubing. As was set forth with respect to FIG. 1, appropriate heat transfer fluid is pumped through the tubing to collect heat absorbed thereby, then pumped to a remote utilization or storage means.

Black vertical plates 38 extend transversely across the duct means, and effectively serve to increase the surface thereof. Backing plate 39 extends horizontally behind tubes 36 and is heated by that radiation which bypasses tubes 36 and plates 38. The heat is then re-radiated within the enclosed cavity and ultimately absorbed by the fluid within tubes 36. Heat absorbed by plate 39 is also transferred to the tubes by conduction. In this manner a larger surface is presented to solar radiation entering the absorption means through glass plates 32, 34.

In a preferred embodiment, the insulation comprises a plurality of layers of insulating material. In order to optimize the construction of the apparatus, and to minimize cost, the innermost layer of insulation 40 may be of a high-temperature insulating material. By this is meant an insulation which will withstand temperatures in excess of 600° F. without noticeable deterioration. Glass wool, asbestos, and other similar materials may be used.

Surrounding the innermost layer of insulation is a separator 42 of aluminum foil. The separator serves to reflect impingent radiation to further reduce convection, and to act as a vapor barrier, aiding in the activity of the insulation layers. An outermost layer 46 of insulation is provided, and may be of a low-temperature material, that is, one which need not withstand temperatures in excess of 600° F. An inexpensive foam material such as urethane may be selected for this purpose in regions where the temperature is below approximately 250° F.

Extending beneath the absorption means is reflecting element 12. As stated above, the reflecting element exhibits a cross-sectional configuration approximating that of a parabolic arc. For reasons to be explained hereinafter, the outermost lip 46 of the parabola may advantageously extend from under the absorption means. Further, the vertex portion of the reflecting means 48 may depart from the actual parabolic configuration shown as dotted line 50 to comprise a chord of the parabolic arc. In this vein it will be appreciated that the entire parabolic surface can be approximated by a series of flat chordal segments.

Figure 3:
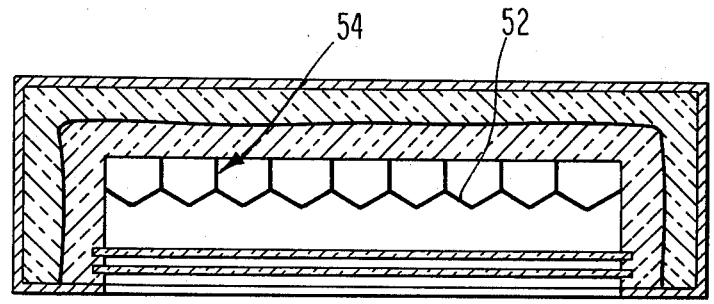
FIG. 3 is a transverse cross-section of another embodiment of the absorption means section of the apparatus.

FIG. 3 discloses an alternative embodiment of the inventive absorption means, wherein the duct means is formed by a cavity immediately above a corrugated black metal plate 52. Extending transversely across plate 52 are a series of vertically-disposed, parallel metal plates 54. The corrugations of plate 52 and the vertically disposed plates 54 serve to extend the effective surface of the duct means to improve the heat transfer characteristics thereof. Circulated air may be directed back and forth by the vertical plates in the region above plate 52, absorbing heat from contact with the plates and being pumped to a distant site for utilization or storage. In such a case additional rigid duct surfaces are unnecessary to separate the moving air from the surrounding insulation material. If a liquid such as water is selected for use as the heat transfer medium it will of course be necessary to line the insulation disposed above plates 52 and 54 with an appropriate material for isolating the fluid from the insulation.

Figure 4:
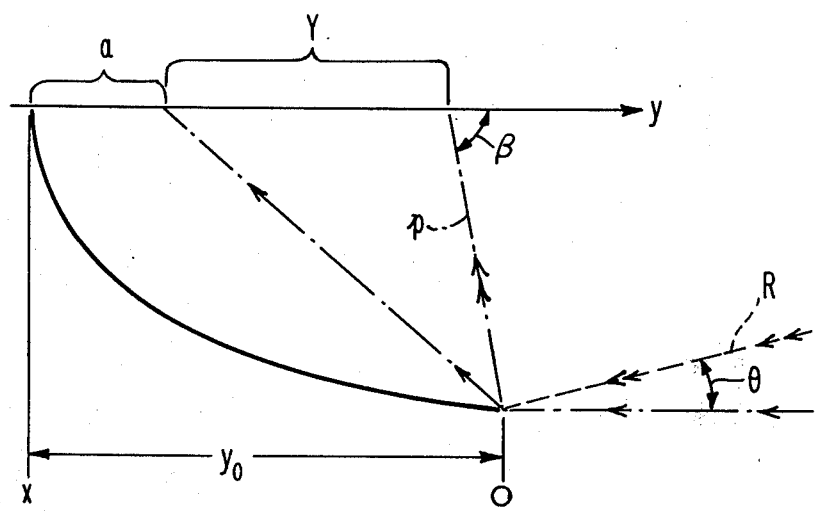
FIG. 4 is a diagram illustrating the geometric relation of certain of the components of a preferred embodiment.

FIG. 4 shows in detail the geometry of the inventive apparatus. The cross-section of the parabolic cylindrical surface of reflecting element 12 is presented as a parabolic arc. For purposes of reference, the arc is shown in relation to a pair of cartesian coordinate axes $x$ and $y$ and has its focus located a distance $a$ from its apex. For ease in explanation, the $x$ axis is shown as extending vertically while the $y$ axis is horizontal, and generally perpendicular to the long axis of the reflecting surface generated by translating the parabolic arc. The overall horizontal dimension perpendicular to the translation direction of the arc or lateral width of the reflector surface is denoted by $Y_0$, while the absorption means extends in the same direction for some distance $Y$ past the focal point. The inner edge of the absorption means may then be at any point between the apex of the parabola and a distance $Y+a$ therefrom. However, the total lateral width of the abosorption means must be at least equal to the distance from the vertex of the reflector parabola to its focus. Preferably, the absorption means exhibits a width which is twice this distance.

A line $p$ connects the outermost edge of the absorption means to the outermost edge of the reflecting surface, defining an angle B with the horizontal as shown. As the parabola may be considered to be defined by the expression $Y = x^2/4a$ the focus of the parabola is at a distance $a$ from the origin of the coordinate system. In a preferred embodiment $a$ represents the distance from the origin to the inner edge of the absorption means or to a point along the bottom of the absorption means. Finally, for purposes of illustration, a solar ray R is shown striking the reflective surface at an angle $\theta$ to the horizontal.

A light ray which strikes the reflective surface adistance $y$ from the $x$ axis will strike the absorption means a distance $Y + a$ therefrom where $$Y = a(1 + Ya^{-1})^2 \sin\theta \, [(ya^{-1}-1)\sin\theta + 2\,(y/a)^{1/2} \cos\theta]^{-1}$$

with $a$ being the focal length of the parabolic surface and $y$ being the horizontal distance from the point O to the vertex end of the parabolic surface. Here $\theta$ is the maximum angle defined by the sun's rays during the cold months of the year, when a maximum amount of solar energy collection is desired. The length of the absorber (along the translation direction of the arc) is the same as that of the reflector, as can be seen from FIG. 1, and the width thereof is $Y$ or, alternatively, $Y + a$. The absorption means is placed between the focus and the point a distance $Y$ from the focus or alternatively, between the origin ($y=0$) and $Y+a$, or at some other convenient location dictated by the locus of the sun's position in the sky.

Concentration of the solar energy may be expressed as $p/Y$ where $p$ is represented by the appropriately-labeled line in FIG. 4. $p/Y$ is equal to $$\frac{[(Ya^{-1}+1-ya^{-1})^2 + 4ya^{-1}]^{1/2}}{Ya^{-1}}$$

For solar radiation striking the reflective surface at an angle $\theta$ which is equal to zero, the concentration of solar rays is infinite. As the angle $\theta$ increases, the concentration of energy decreases. It can be shown for instance that for collection apparatus arranged as in FIG. 4 and whose dimensions are chosen such that $y/a = 3$, the concentration $p/Y$ is approximately equal to 3.3 for an angle $\theta$ of 15°, and approximately 1.7 for an angle $\theta$ of 30°.

The angle B that the line $p$ forms with the horizontal may be expressed as $$\tan B = -2\,(y/a)^{1/2}\,[1 + Ya^{-1} - ya^{-1}]^{-1}$$

For a value of $y/a$ of 3 and a value $Y/a$ of 2, it can accordingly be shown that B equals 90°, for an angle $\theta$ of 30°. For values of $y/a$ of 5 and $Y/a$ of 3, the angle B is 78°.

While in a preferred embodiment the axis of symmetry ($y$ axis) of the parabolic reflector is horizontal, and parallel with the absorption means, it may be tilted to a non-zero angle for a particular installation. Further, the apparatus can be movably mounted to "track" the sun's movement although by apportioning the absorption means and the reflector according to the teachings of the present invention the need for such movement may be obviated.

It will now be seen that there has been disclosed herein an improved form of solar energy collection apparatus, having superior absorption and heat transfer capabilities, and further having the advantage of not needing to be moved or steered as the sun's attitude changes, either during the day or from season to season. For example, if the longitudinal axis of the apparatus (translation axis of the parabolic arc) is oriented in a generally east-west direction so that the parabolic cylindrical surface opens in a southerly direction, the geometry of the apparatus may be adjusted in accordance with the teachings of the present invention so that the maximum concentration of the sun's rays occurs when the sun's rays make the lowest angle with respect to the horizontal, that is, during mid-winter. As the sun's angle increases, or becomes higher, with the onset of warmer weather, the angle $\theta$ increases and the concentration of the sun's rays upon the absorption means lessens, thus automatically compensating for the decreased need for solar energy.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A radiant solar energy collection apparatus for supressing convective loss, comprising:
   a. an absorption means for absorbing solar radiation while minimizing said convective loss, said means comprising:
      i. an insulated outer shell defining a substantially imperforate downwardly directed cavity and an aperture extending across at least a portion of the lower surface of said cavity, said shell comprising at least one layer of insulation means for insulating the entire surface of said cavity for preventing the transmission of energy therethrough;

ii. sheet means disposed to entirely close said aperture, for transmitting solar energy through said aperture; and iii. an absorber means, disposed within said cavity spaced apart from said sheet means and surrounded on the top and all sides by said shell so that substantially all portions of said absorber are disposed above any substantial portion of said sheet means, for absorbing incident radiant energy transmitted through said sheet means to substantially prevent convective currents from developing between said absorber and said sheet means;

b. an elongate reflecting element disposed substantially beneath said absorption means for directing radiant solar energy upwardly through said sheet means and upon said absorber.

2. The invention of claim 1 wherein said apparatus further comprises a duct means extending within said cavity and adapted to conductively receive heat from said absorber and to transport said heat from said absorption means.

3. The invention of claim 1 wherein said sheet means comprises a pair of light transmitting sheets disposed parallel to each other, each of which extends across said aperture to close said aperture.

4. The invention of claim 1 said insulation means further comprises reflective means for reflecting radiant energy emitted by said absorber back towards said absorber.

5. The invention of claim 4 wherein said insulation means further comprises a first inner layer of high temperature resistant insulation, an intermediate dividing layer of metal foil, and an outer layer of relatively low-temperature resistant insulation.

6. The invention of claim 1 wherein at least a portion of said elongate reflecting element defines at least a portion of a parabolic cylinder.

7. The invention of claim 6 wherein the dimension of the cylindrical axis of said parabolic reflector is parallel to and substantially equal to the longitudinal dimension of said absorber.

8. The invention of claim 1 wherein said parabolic reflector is attached to said shell adjacent said aperture.

9. The invention of claim 3 wherein said absorber further comprises coating means to absorb incident radiant solar energy with high absorptivity and to re-radiate infrared radiation with low emissivity.

* * * * *